July 4, 1933.     A. B. DU MONT     1,916,364
AUTOMATIC TESTING APPARATUS
Filed April 27, 1928
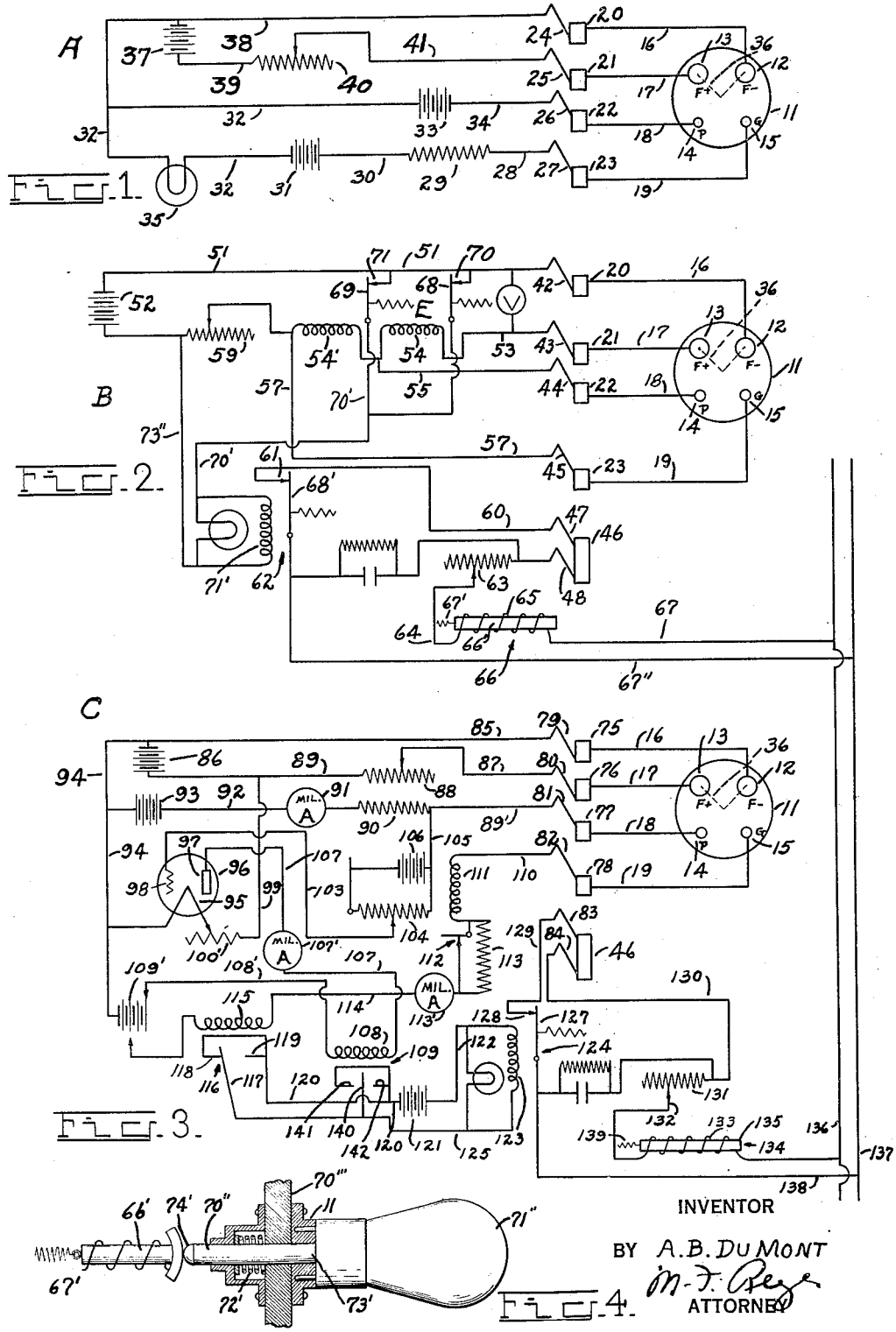
INVENTOR
BY A. B. DU MONT
ATTORNEY Patented July 4, 1933

1,916,364

UNITED STATES PATENT OFFICE

ALLEN B. DU MONT, OF BLOOMFIELD, NEW JERSEY, ASSIGNOR TO WESTINGHOUSE LAMP COMPANY, A CORPORATION OF PENNSYLVANIA

AUTOMATIC TESTING APPARATUS

Application filed April 27, 1928. Serial No. 273,233.

This invention relates to the manufacture of electrical devices such as radio tubes or the like and relates more particularly to apparatus for automatically "seasoning" and testing such devices.

In the manufacture of thermionic devices such, for example, as radio tubes, it is necessary after the device is structurally complete, to subject the same to what is termed a seasoning operation. This operation consists in applying a given voltage to one or more of the elements or electrodes within the device, causing an electron stream which destroys impurities upon certain of the internal electrodes and may improve the vacuum by reducing the residual gas within the device.

Although the present invention is useful in connection with electrical devices of different types, it will be described and illustrated in connection with radio tubes.

Heretofore radio tubes were given a seasoning treatment in a seasoning machine prior to a testing operation in a testing apparatus such as disclosed in my Patent 1,814,437 issued July 14, 1931. The present invention combines the testing and seasoning operations in one machine. Furthermore, whereas the testing apparatus such as disclosed in the said patent employed a photo-electric or selenium cell for controlling certain of the operations of the machine, the present invention includes a control circuit comprising an amplifier tube.

It is, therefore, an object of the present invention to provide a machine for automatically performing a seasoning and testing operation.

Another object of the invention is to provide a more effective and rapidly operating control circuit.

Other objects and advantages of the invention will be apparent as the description proceeds.

The invention will be more clearly understood from the following description together with the accompanying drawing in which:

Fig. 1 is a diagram of a seasoning or gas clean-up circuit.

Fig. 2 is a diagram of a testing circuit for testing certain characteristics of electrical devices;

Fig. 3 is a diagram of another circuit for testing electrical devices; and

Fig. 4 is a fragmentary view partly in section of a conveyor carrying mechanism which cooperates with a solenoid to eject tested devices.

Although the several circuits are shown separate with individual current supply, it is to be understood that a common source of electrical energy may be provided for all the circuits.

The present apparatus may be generally the same as that disclosed in my above mentioned patent. As shown and described in the said patent, a testing apparatus is provided in which devices to be tested such as radio tubes, are placed in sockets on a movable conveyor which is preferably in the form of a disc. The disc is provided with contact members or tracks having electrical connection with the respective contact members within the sockets and brushes are provided to successively connect the contact members or tracks with a plurality of electrical circuits.

In the present invention, various circuits are so arranged that a tube is first moved into operative relation with a circuit, indicated in the drawing as A, which is a seasoning or clean-up circuit and then successively into operative relation with circuits B and C which are testing circuits.

The arrangement of the various actuating elements is such that the test circuits are first connected up allowing the provided meters, relays, etc., to come to fixed positions before a power ejector circuit is connected. This serves a double purpose in that greater speed is attained, because the ejector circuit is not connected in while the meters and relays are becoming stabilized and it permits the system to be operated with all the circuits set at "danger" that is to eject a tested device when the various settings are normal.

The apparatus generally may be the same as that shown and described in the above mentioned patent and a carrier may be provided with sockets 11. Each of the sockets may have contact members 12, 13, 14 and 15 connected by conductors 16, 17, 18 and 19 to contacts in the form of tracks 20, 21, 22 and 23 which are movable with the sockets and engageable with brushes associated with the several circuits A, B and C.

The circuit A operates to subject the devices to a seasoning schedule and the said circuit A is provided with brushes 24, 25, 26, and 27 for engagement with the tracks 20, 21, 22 and 23 respectively.

Although various seasoning schedules may be provided, depending upon the character of the seasoning or clean-up of the gas desired, the present embodiment of the invention includes a circuit having conductor 28, resistance 29, conductor 30, a source of electrical energy in the form of a battery 31, a conductor 32, a battery 33 and a conductor 34 connecting with the brush 26. The brush 27 connects with the conductor 19 for supplying energy to the grid contact 15 while the brush 26 permits a flow of energy through the track 22 to the plate contact 14.

By reason of this circuit, a source of energy 31 of the order of 125 volts, may be applied to the grid. A negative voltage of 6 volts from the source of energy 33 may be applied to the plate. As a protection, the resistance 29 of 300 ohms is provided as well as a 75 watt lamp 35 inserted in the grid circuit to prevent the batteries against short circuit.

As shown, a filament 36, indicated by the dotted lines is heated by a flow of current from a source of electrical energy 37 through conductor 38 which connects with brush 24 and conductor 39, variable resistance 40 and conductor 41 which connects with the brush 25. By the disposition of this circuit A prior to the testing operation, the devices are subject to a clean-up or seasoning treatment.

Circuit B tests for open filaments, filament to plate short circuit and grid to plate short circuit, and is generally the same as the first testing circuit in the above mentioned patent and after the device has moved from the seasoning schedule circuit, the contact rings engage brushes 42, 43, 44 and 45 while a contact ring 46 engages brushes 47 and 48. These latter brushes operate to supply electrical energy to a power or ejector circuit, the purpose of which will be presently described.

Considering the circuit B, the contacts 12 and 13 may be connected by conductors 16 and 17 to tracks 20 and 21 respectively. The brush 42 is connected by a lead 51 to a source of electrical energy 52. The brush 43 is connected by a conductor 53 to one side of master relays E. The opposite ends of the coils 54 and coil 54' of the master relays may be connected by a conductor 55 to brush 44 engageable with the track 22 which conductor connects with the contact member 14 through conductor 18 and constitutes a plate circuit.

The grid contact 15 of the socket 11 is connected by the conductor 19 to the track 23 which engages with the brush 45 which is connected by a conductor 57 to coil 54' of the master relays E. The conductor 57 is connected to the source of energy 52 through a variable resistance 59. Track 46 which may be termed the power or solenoid contact of the conveyor engages with the brushes 47 and 48, the brush 47 being connected by a conductor 60 to a contact 61 of a relay 62 and the brush 48 is connected through a variable resistance 63 to an end 64 of coil 65 of a solenoid 66. The said solenoid may be of any suitable type having an armature 66' normally held retracted by a spring 67'. The opposite end of the coil 65 is connected by a conductor 67 with any suitable source of electrical current supply, the return flow passing through conductor 67'' which is connected to arm 68' of the relay 62. If a tube is applied to a socket 11, electrical energy will flow from the source of energy 52 through lead 51, brush 42, track 20, conductor 16, filament 36, conductor 17, track 21, brush 43, conductor 53 through the coils 54 and 54' of the relays E, resistance 59 and thus to the source of energy 52.

The solenoid shown in connection with both circuits B and C is, of course, diagrammatic; by reference to Fig. 4, however, the operation of the solenoids will be clear. The said Fig. 4 shows a portion of a conveyor 70''' having sockets 11 disposed in spaced relation for movement successively in operative relation to the circuits A, B and C. A radio tube 71'' is shown supported in a socket. Extending through the center of the socket is a plunger 70'' normally held by a spring 72' to maintain an end 73' flush with the surface of the socket. An opposite end 74' of the plunger is disposed for movement to position for contact with an armature as 66' of a solenoid. The armature 66' is, however, held retracted by a spring as spring 67'.

It will be evident that since each socket is provided with the above described plunger that when the socket is in position opposite a solenoid the device being tested will be ejected depending upon what the effects of the characteristics of the device have upon the particular circuit to which the device happens to be applied.

It will be evident that in the circuit just described, when the filament 36 is intact and permits a flow of current through the relays E, movable arms 68 and 69 will be positioned away from contacts 70 and 71, these contacts being connected to the source of energy 52. Arms 68 and 69 are connected by conductor 70' to one side of a coil 71' of a power control relay 72. The opposite side of the coil 71' may be connected by a conductor 73' to the source of energy 52. Thus upon a contact with either of the arms 68 or 69 against their respective contacts, a flow of energy will occur in the coil 71' of the relay 62. The arms 68 and 69 may be provided with the usual spring or tension members operating to bring the arms into engagement with the contacts when released from the influence of the coils 54 and 54'. Thus a flow of current through the relays as when the filament is unbroken, will break the circuit comprising leads 51 and 73".

The circuit C is also generally the same as one of the circuits in the above mentioned copending application except that in the present arrangement instead of providing a selenium or photo-electric cell, I provide a vacuum tube amplifier operating a sensitive relay, the amplifier is operated by the varying voltage drop across a resistance.

Circuit C tests for low emission electrical leakage and gassy tubes as well as for the defects which affect circuit B.

As illustrated, the contacts 12, 13, 14, and 15 of the socket 11 are connected by conductors 16, 17, 18 and 19 to tracks 75, 76, 77 and 78 and brushes 79, 80, 81 and 82 respectively. All the sockets with their respective leads are similar, each circuit, however, has an individual set of brushes, the tracks being divided into sets, each circuit being associated with an independent set of tracks. The brushes for the solenoid track 46 are indicated by numerals 83 and 84. The brush 79 is connected by conductor 85 to a source of energy 86. Brush 80 is connected to conductor 87, resistance 88 and conductor 89 leading to the source of energy 86, thus completing the filament circuit. The brush 81 may be connected by conductor 89', resistance 90, milliammeter 91, conductor 92 to a source of electrical energy 93. The said source of energy 86 may be connected by conductor 94 with one side of a filament 95 of an amplifier tube 96.

The said amplifier tube may be of any suitable type as a radio tube and have in addition to the filament 95 a plate 97 and a grid 98. The opposite side of the filament 95 may be connected to the source of energy 86 by a conductor 99 through a resistance 100'. The grid 98 of the amplifier tube is connected by conductor 103 to one side of a resistance 104, which resistance is connected by conductor 105 to plate lead of tube under test. A source of electrical energy 106 is provided to vary the voltage on the grid of the amplifier tube 96.

Plate 97 is connected by conductor 107 through milliammeter 107' to one side of coil 108 of a supervisory relay 109 which is affected by the gas current when present in a tube being tested. The opposite side of the coil 108 is connected by conductor 108', battery 109' and conductor 94 with source of electrical energy 86.

The grid contact 15 of socket 11 is connected through conductor 19, track 78, brush 82 and a conductor 110 to a coil 111 of a protective relay 112, resistance 113, milliammeter 113', conductor 114 with a coil 115 of a supervisory relay 116 which is affected by high or low emission in the device being tested.

Initially, a pointer 117 of the relay 116 engages contact 118 and is movable when the coil 115 is sufficiently energized to engage contact 119. The contacts 118 and 119 are connected by conductor 120 to a source of electrical energy 121; the return flow passing through conductor 122, coil 123 of relay 124 and conductor 125, the said conductor 125 being connected to the arm or pointer 117 of the relay 116. Inasmuch as the pointer 117 closes the circuit through the coil of relay 124, an arm 127 thereof will engage a contact 128 which is connected with brush 83 by conductor 129. The brush being in contact with track 46, it is in electrical connection with brush 84 which is connected by conductor 130 through resistance 131 and conductor 132 with one end of coil 133 of a solenoid 134 having a movable armature 135. The opposite end of the coil 133 is connected to one side 136 of any suitable source of electrical energy. The return flow of current is provided for by conductors 137 and 138, the latter being connected with the pointer 127.

When the pointer 117 of the relay 116 is engaged with the contact 118, the armature is in its forward position to eject a device being tested since a lack of flow of energy through the coil 115 will mean lack of emission in the device. If the proper degree of emission is present in the device, the pointer 117 will move from the contact 118, thus breaking the circuit through the coil 123 of the power relay 124 and a spring 139 will be free to act to retract the armature 135, permitting the device to pass. If a grid filament short occurs, however, the pointer 117 will engage contact 119 closing the circuit through the relay 124 to project the armature for the removal of the device.

While the tube is being tested for emission, it is also tested for gas current which affects the relay 109, causing a pointer 140 to swing either toward contact 141 or 142. These contacts are connected to conductor 120 while the pointer 140 is connected to connector 125, thus when the pointer makes contact, a flow of energy passes from source 121, through coil 123 and in the event that the emission of the device is correct but the gas current too high, then the relay 124 will be actuated to project the armature 135 to eject the device.

In case there is a failure of filament in the amplifying tube or a failure in the amplifier circuit or a failure of the plate voltage applied to the amplifier tube, no current will flow through the relay 109, thereby causing contact 104 to engage contact 141 and eject the device being tested. If the grid voltage supply fails then pointer 140 will engage contact 142 as is the case with gassy tubes to eject the device. It will be evident, therefore, that the electrical system employs precautionary methods against the failure of the amplifier tube, whereby in the event of such failure no devices will be ejected as having the proper characteristics.

As hereinbefore stated, the circuit A is provided to subject electrical devices such, for example, as radio tubes to a seasoning schedule. This circuit as shown, by means of the source of electrical energy 31, impresses a high voltage, preferably 125 volts, on the grid of a tube through contact 15, and a negative voltage of about 6 volts, indicated by battery 33 in the drawing, is applied to the plate of the tube through contact 14. A protective resistance 29 of about 300 ohms and a 75 watt lamp may be inserted in the grid circuit to protect the batteries against short circuit.

Regarding the circuit B, it is to be noted that this circuit is substantially the same as the circuit in the said patent which is employed for testing for open filaments, filament to plate short circuit and grid to plate short circuit.

Present circuit C is generally the same as the circuit employed in the same copending application used for detecting gassy tubes, minus filament to plate leakage, plus filament to plate leakage, grid to plate leakage, degree of emission, also defects enumerated for present circuit B.

The present circuit C, however, differs from the circuit of my previous patent in that, whereas in that circuit a photo-electric or selenium cell was employed to actuate a solenoid for ejecting gassy tubes or tubes with improper emission, the present circuit employs means whereby the tests made for emission or gas may be made at a high rate of speed. This is accomplished by the amplifier tube 96 which operates sensitive relays. The amplifier is operated by the varying voltage drop across a high resistance 90, say on the order of one-half million ohms. With no current flowing in the plate circuit, there will be no voltage drop across the said resistance.

If a current of say 5 microamperes flows through the plate circuit there will be a voltage drop of 2½ volts across the resistance which is applied to the grid of the amplifier tube. This causes a corresponding change in the plate current which actuates the sensitive relays, causing an actuation of the armature of the solenoid depending upon the degree or amount of current flow in the coils of the relays.

The present invention provides for the seasoning and testing of electrical devices and the novel combination of the means employed makes it possible to subject devices to a seasoning schedule and subsequently test the devices to determine the effect of the seasoning schedule. For example, if the seasoning operation is performed to clean up excessive gas within the tube or to destroy impurities upon certain of the electrodes so that the proper electron emission of the cathode may be attained, the testing device operating in conjunction with the seasoning circuit serves as an automatic check upon the effectiveness of the operation of the said circuit. It will be seen, therefore, that the testing machine may be operable to test for characteristics determined by or resulting from the seasoning operation.

In testing devices of the character to which the present invention relates it is important to be able to test at a relatively high rate of speed and although the apparatus in the above mentioned patent operated successfully to test tubes at the rate of 3000 per hour it was found desirable to increase the rate of test to speeds exceeding 10,000 per hour. Inasmuch as that in the determination of the characteristics of a radio tube or the like exceedingly small amounts of current must be handled, difficulty arises in utilizing these currents to actuate mechanisms for the assortment of the devices in accordance with their various characteristics.

In the present invention an amplifier tube is employed so as to be affected by and amplify minute currents to such degree as to make them of sufficient strength to cause a flow of current to operate mechanism for ejecting a device having a predetermined characteristic. Furthermore, the present circuit provides for the operation thereof as a supervised circuit, as, for example, if the amplifier tube should fail, a relay will operate, discharging all the tubes as above mentioned. This result would also follow if the filament plate or grid voltage should for any reason fail. The importance of this condition will be readily recognized since if such supervision did not exist a failure of one of the above elements might occur and defective tubes might be ejected in the place of good tubes and a condition would arise which would not be desirable unless an additional check was made upon the tubes tested.

The present invention provides an automatic and effective combined treating or seasoning and testing machine in which electrical devices are not only assorted for predetermined characteristics but in which one of the operations is performed as ordinarily attends the manufacture of such devices, thus the present machine combines two machines in one and saves time and labor as well as effecting an economy in floor space. The word seasoning is used herein as meaning a treatment of the device to improve its quality or operativeness and as above set forth includes the application of a potential to certain elements within the tube. It is to be understood, however, that the seasoning operation described may vary.

Although a preferred embodiment of the invention is shown and described herein, it is to be understood that modifications may be made therein without departing from the spirit and scope of the invention as set forth in the appended claims.

What is claimed is:

1. An electrical testing system comprising a testing circuit, a supervisory circuit, an electrically operable ejector means in said supervisory circuit, a relay controlling said supervisory circuit, means for amplifying the flow of energy through said testing circuit from a device being tested to actuate said relay to cause electrical energy to flow through said supervisory circuit and actuate said ejector means and means for actuating said ejector means in the absence of a flow of electrical energy through said amplifying means.

2. An electrical testing system comprising a testing circuit, a supervisory circuit, an electrically operable ejector means in said supervisory circuit, a relay controlling said supervisory circuit, an electron emission device for amplifying the flow of energy through said testing circuit from a device being tested to actuate said relay to cause energy to flow through said supervisory circuit and actuate said ejector means and means for actuating said ejector means in the absence of a flow of energy through said electron emission device.

In testimony whereof, I have hereunto subscribed my name this 26th day of April 1928.

ALLEN B. DU MONT.